(12) United States Patent
Kagawa et al.

(10) Patent No.: US 10,541,590 B2
(45) Date of Patent: Jan. 21, 2020

(54) FLUID MACHINE

(71) Applicant: KABUSHIKI KAISHA TOYOTA JIDOSHOKKI, Kariya-shi, Aichi-ken (JP)

(72) Inventors: Fumihiro Kagawa, Kariya (JP); Atsushi Naito, Kariya (JP); Yusuke Kinoshita, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 370 days.

(21) Appl. No.: 15/473,096

(22) Filed: Mar. 29, 2017

(65) Prior Publication Data

US 2017/0288512 A1    Oct. 5, 2017

(30) Foreign Application Priority Data

Mar. 31, 2016  (JP) ................................ 2016-072928

(51) Int. Cl.
*H02K 11/02*  (2016.01)
*B60H 1/32*  (2006.01)
(Continued)

(52) U.S. Cl.
CPC ........... *H02K 11/33* (2016.01); *B60H 1/3222* (2013.01); *H02K 11/022* (2013.01); *B60H 2001/3292* (2013.01)

(58) Field of Classification Search
CPC ........ H02K 11/00; H02K 11/01; H02K 11/02; H02K 11/30; H02K 11/33; H02K 9/19;
(Continued)

(56) References Cited

U.S. PATENT DOCUMENTS 6,215,679 B1 * 4/2001 Yamane ................ H02M 7/003
                                                        257/E25.029
8,777,585 B2  7/2014 Nakano et al.
(Continued)

FOREIGN PATENT DOCUMENTS

JP  2001211663 A  8/2001
JP  2003-324900 A  11/2003
(Continued)

OTHER PUBLICATIONS

Communication dated May 8, 2018, from Japanese Patent Office in counterpart application No. 2016-072928.

*Primary Examiner* — Quyen P Leung
*Assistant Examiner* — Eric Johnson
(74) *Attorney, Agent, or Firm* — Sughrue Mion, PLLC

(57) ABSTRACT

A fluid machine includes a housing including a suction port through which fluid is drawn, an electric motor accommodated in the housing, and a drive device configured to drive the electric motor. The drive device includes a circuit board, a heat-generating component, and a metal member. The circuit board includes a pattern wire. The circuit board is opposed to an outer surface of the housing. The heat-generating component is located between the circuit board and the outer surface of the housing and spaced apart from the circuit board. The heat-generating component generates electromagnetic noise. The metal member is at least partially located between the circuit board and the heat-generating component. The metal member is configured to transmit heat from the heat-generating component to the housing and absorb or block the electromagnetic noise.

4 Claims, 3 Drawing Sheets

(51) Int. Cl.
*H02K 11/33* (2016.01)
*H02K 11/22* (2016.01)

(58) Field of Classification Search
CPC .......... H02K 9/193; H02K 9/197; H02K 9/20; H02K 9/22; B60H 1/3222; B60H 2001/3292
USPC ....................................................... 310/68 D
See application file for complete search history.

(56) References Cited

U.S. PATENT DOCUMENTS

| | | | | |
|---|---|---|---|---|
| 2001/0012212 A1* | 8/2001 | Ikeda | .................... | H02M 7/003 363/141 |
| 2003/0206815 A1 | 11/2003 | Iritani | | |
| 2008/0205107 A1* | 8/2008 | Hattori | .................. | H05K 7/1432 363/123 |
| 2010/0183457 A1* | 7/2010 | Hattori | .................. | H01L 23/492 417/410.1 |
| 2011/0163705 A1* | 7/2011 | Sato | ...................... | H02K 11/024 318/400.24 |
| 2011/0261588 A1* | 10/2011 | Hattori | .................. | F04B 39/121 363/13 |
| 2013/0049550 A1* | 2/2013 | Watanabe | .............. | F04B 39/121 310/67 R |
| 2015/0061558 A1* | 3/2015 | Yano | ..................... | F04B 39/121 318/400.26 |
| 2018/0254685 A1* | 9/2018 | Seki | ........................ | F04C 2/102 |

FOREIGN PATENT DOCUMENTS

| | | |
|---|---|---|
| JP | 5039515 B2 | 10/2012 |
| JP | 2013021918 A | 1/2013 |

* cited by examiner

FLUID MACHINE

TECHNICAL FIELD

The present invention relates to a fluid machine.

BACKGROUND ART

A known motor-driven compressor serving as a fluid machine includes an electric motor and a drive device that drives the electric motor (refer to, for example, Japanese Laid-Open Patent Publication No. 2003-324900). The drive device is coupled to a housing through which fluid is drawn. Heat is exchanged between the fluid and the drive device through the housing to cool the drive device.

SUMMARY OF THE INVENTION

The drive device includes a heat-generating component that needs to be cooled. The heat-generating component may generate electromagnetic noise in addition to heat. When the electromagnetic noise is transmitted from the heat-generating component to a circuit board through the region between the heat-generating component and the circuit board, the electromagnetic noise may enter pattern wires that are formed on the circuit board. This may adversely affect the operation of the drive device and lower the controllability of the electric motor, which is driven by the drive device. In this case, the operation of the fluid machine may be adversely affected.

It is an object of the present invention to provide a fluid machine that increases the efficiency for cooling a heat-generating component and limits the transmission of electromagnetic noise from the heat-generating component to the circuit board.

A fluid machine that solves the above problem includes a housing including a suction port through which fluid is drawn, an electric motor accommodated in the housing, and a drive device configured to drive the electric motor. The drive device includes a circuit board, a heat-generating component, and a metal member. The circuit board includes a pattern wire. The circuit board is opposed to an outer surface of the housing. The heat-generating component is located between the circuit board and the outer surface of the housing and spaced apart from the circuit board. The heat-generating component generates electromagnetic noise. The metal member is at least partially located between the circuit board and the heat-generating component. The metal member is configured to transmit heat from the heat-generating component to the housing and absorb or block the electromagnetic noise.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

EMBODIMENTS OF THE INVENTION

A motor-driven compressor serving as one embodiment of a fluid machine will now be described. The motor-driven compressor is installed in a vehicle for use with an on-vehicle air conditioner.

Figure 1:
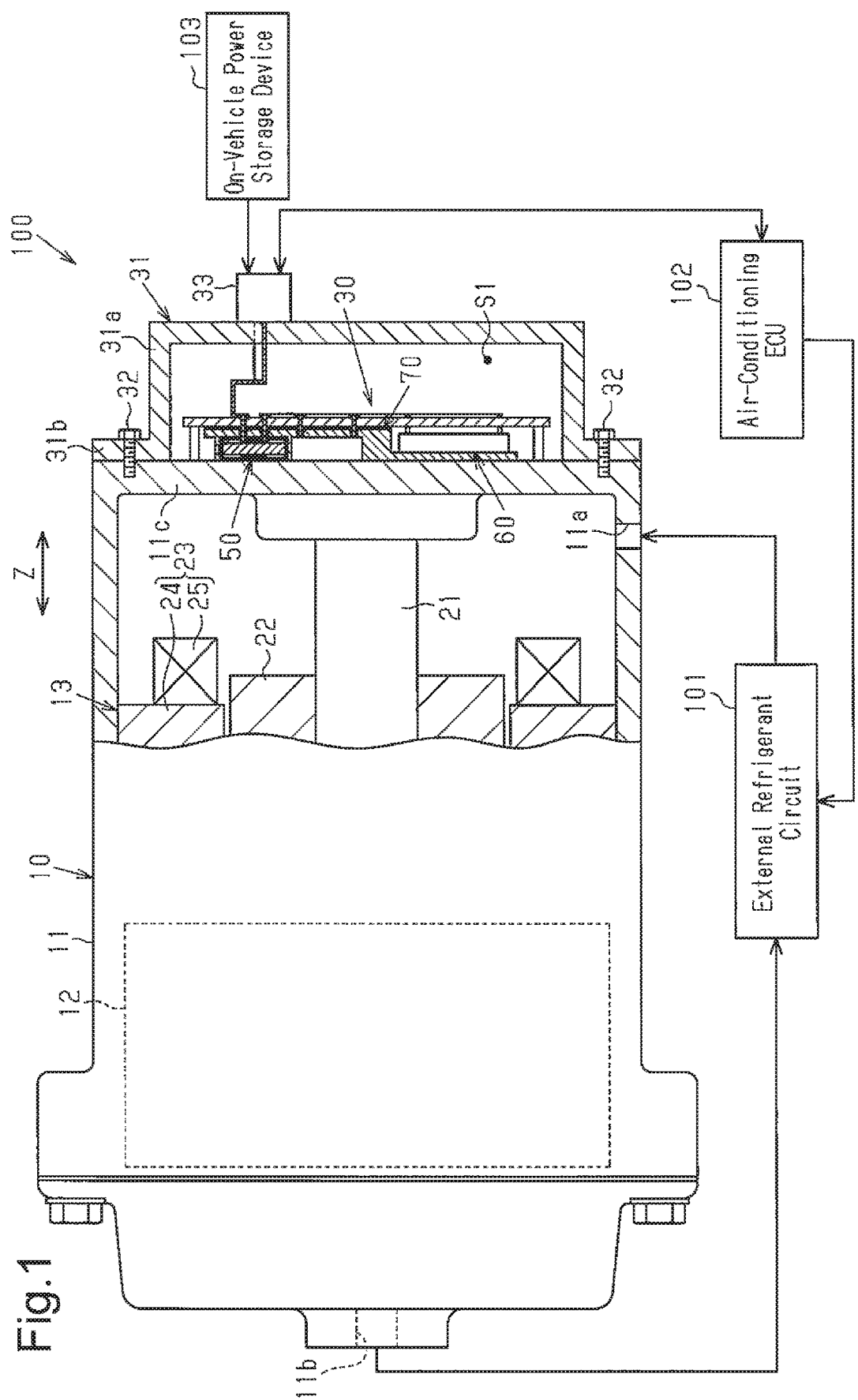
FIG. 1 is a partial cross-sectional view schematically showing a fluid machine.

As shown in FIG. 1, an on-vehicle air conditioner 100 includes a motor-driven compressor 10 serving as a fluid machine and an external refrigerant circuit 101 that supplies refrigerant, which serves as fluid, to the motor-driven compressor 10. The external refrigerant circuit 101 includes, for example, a heat exchanger and an expansion valve. When cooling or heating the passenger compartment, the on-vehicle air conditioner 100 uses the motor-driven compressor 10 to compress refrigerant and the external refrigerant circuit 101 to exchange heat with the refrigerant and expand the refrigerant.

The on-vehicle air conditioner 100 includes an air-conditioning ECU 102 that controls the entire on-vehicle air conditioner 100. The air-conditioning ECU 102 is configured to recognize the passenger compartment temperature, the set temperature of the on-vehicle air conditioner 100, and the like. Based on these parameters, the air-conditioning ECU 102 transmits various instructions such as an activation or deactivation instruction to the motor-driven compressor 10.

The motor-driven compressor 10 includes a housing 11, a compression unit 12, and an electric motor 13. The housing 11 includes a suction port 11a through which refrigerant is drawn from the external refrigerant circuit 101. The compression unit 12 and the electric motor 13 are accommodated in the housing 11.

The entire housing 11 is round and hollow (more specifically, substantially tubular). The housing 11 is formed from a thermally conductive material (for example, metal such as aluminum). The housing 11 includes a discharge port 11b through which refrigerant is discharged. Refrigerant exists in the housing 11, and heat is exchanged between the housing 11 and the refrigerant. That is, the housing 11 is cooled by refrigerant. Further, the housing 11 is electrically connected to ground.

When a rotation shaft 21 (described later) rotates, the compression unit 12 compresses refrigerant drawn through the suction port 11a into the housing 11 and discharges the compressed refrigerant through the discharge port 11b. The compression unit 12 may be of any structure such as a scroll type, a piston type, or a vane type.

The electric motor 13 drives the compression unit 12. The electric motor 13 includes the rotation shaft 21 that is, for example, rotationally supported by the housing 11, a tubular rotor 22 fixed to the rotation shaft 21, and a stator 23 fixed to the housing 11. The axial direction of the rotation shaft 21 corresponds to the axial direction of the tubular housing 11. The stator 23 includes a tubular stator core 24 and coils 25 that are wound around teeth of the stator core 24. The rotor 22 and the stator 23 are opposed to each other in the radial direction of the rotation shaft 21. When current is supplied to the coils 25, the rotor 22 and the rotation shaft 21 rotate so that the compression unit 12 compresses refrigerant.

As shown in FIG. 1, the motor-driven compressor 10 includes an inverter device 30, a cover 31, and fasteners 32. The inverter device 30 serves as a drive device that drives the electric motor 13. The cover 31 defines an accommodation chamber S1, which accommodates the inverter device 30, in cooperation with the housing 11. The fasteners 32 fasten the cover 31 to the housing 11.

The cover 31 is coupled to a coupling wall 11c that is one of the two end walls of the housing 11 and located at a side opposite to the discharge port 11b in the axial direction of the rotation shaft 21. The compression unit 12, the electric motor 13, and the inverter circuit 60 are arranged in the axial direction of the rotation shaft 21. That is, the vehicle motor-driven compressor 10 is of an in-line type.

The cover 31 is formed from, for example, metal such as aluminum. The entire cover 31 is tubular. The cover 31 includes a body 31a including a bottom portion (end wall) and a side portion (circumferential wall) that extends from an outer edge of the bottom portion. The side portion includes a first end that is continuous with the bottom portion and a second end located at a side opposite to the first end. Further, the cover 31 includes a flange 31b extending sideward from the second end (radially outward from rotation shaft 21). The fasteners 32 fasten the flange 31b to the coupling wall 11c.

The accommodation chamber S1, which accommodates the inverter device 30, is defined by the body 31a and the coupling wall 11c. That is, the accommodation chamber S1 is defined by the body 31a, which is formed from a metal, and the coupling wall 11c. Refrigerant does not flow into the accommodation chamber S1.

The cover 31 includes a connector 33 that electrically connects the inverter device 30 to the air-conditioning ECU 102 and the on-vehicle power storage device 103. The inverter device 30 is supplied with direct current power from the on-vehicle power storage device 103.

The inverter device 30 is electrically connected to the coils 25 by hermetically sealed terminals (not shown) formed on the coupling wall 11c. The inverter device 30 converts direct current power from the on-vehicle power storage device 103 into alternating current power that drives the electric motor 13. The converted alternating current power is supplied to the coils 25 to drive the electric motor 13.

The inverter device 30 shares the on-vehicle power storage device 103 with other on-vehicle devices. The other on-vehicle devices include, for example, a power control unit (PCU) and may differ in accordance with the vehicle type.

Figure 2:
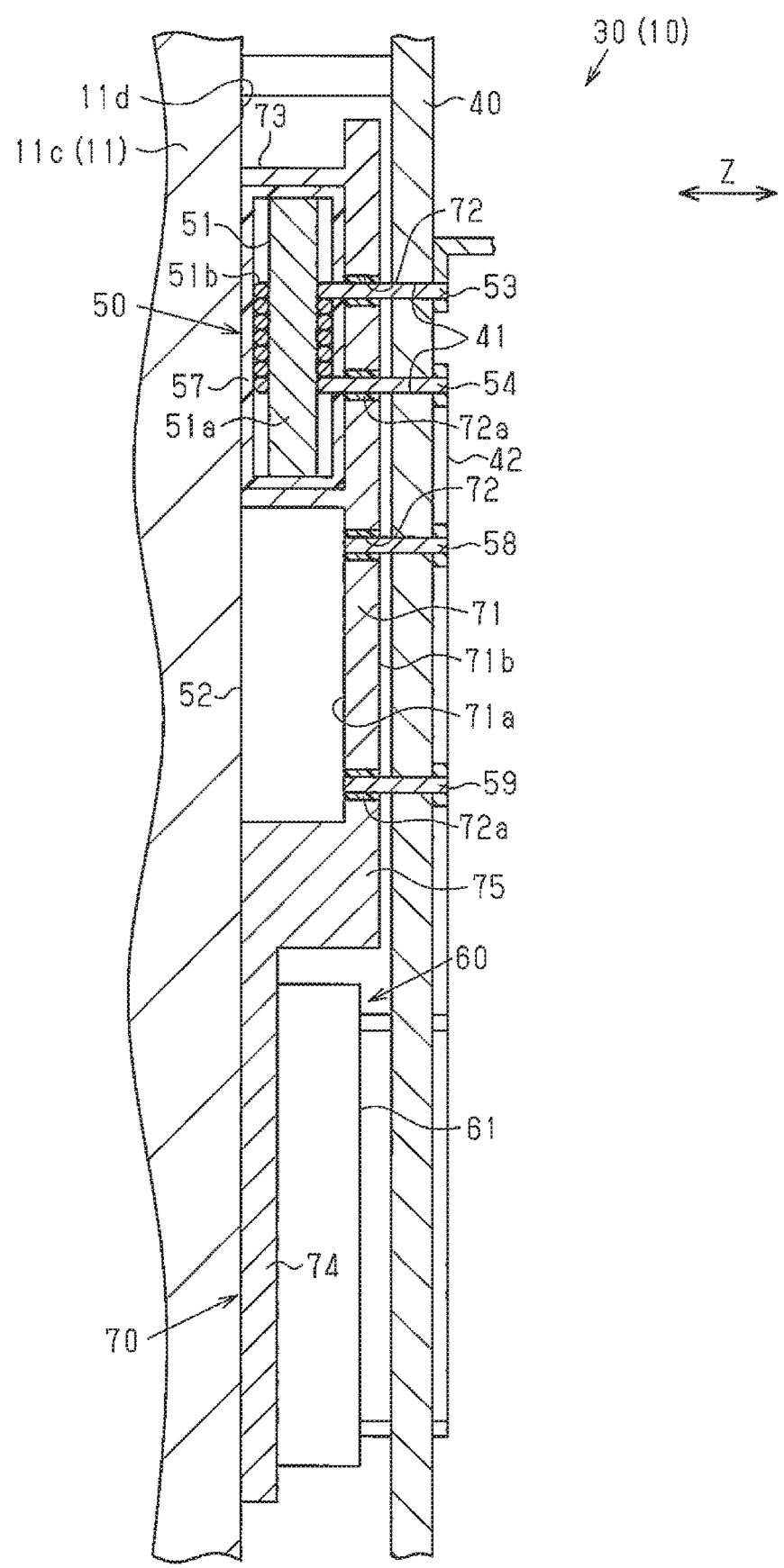
FIG. 2 is an enlarged cross-sectional view of an inverter device in the fluid machine shown in FIG. 1.
Figure 3:
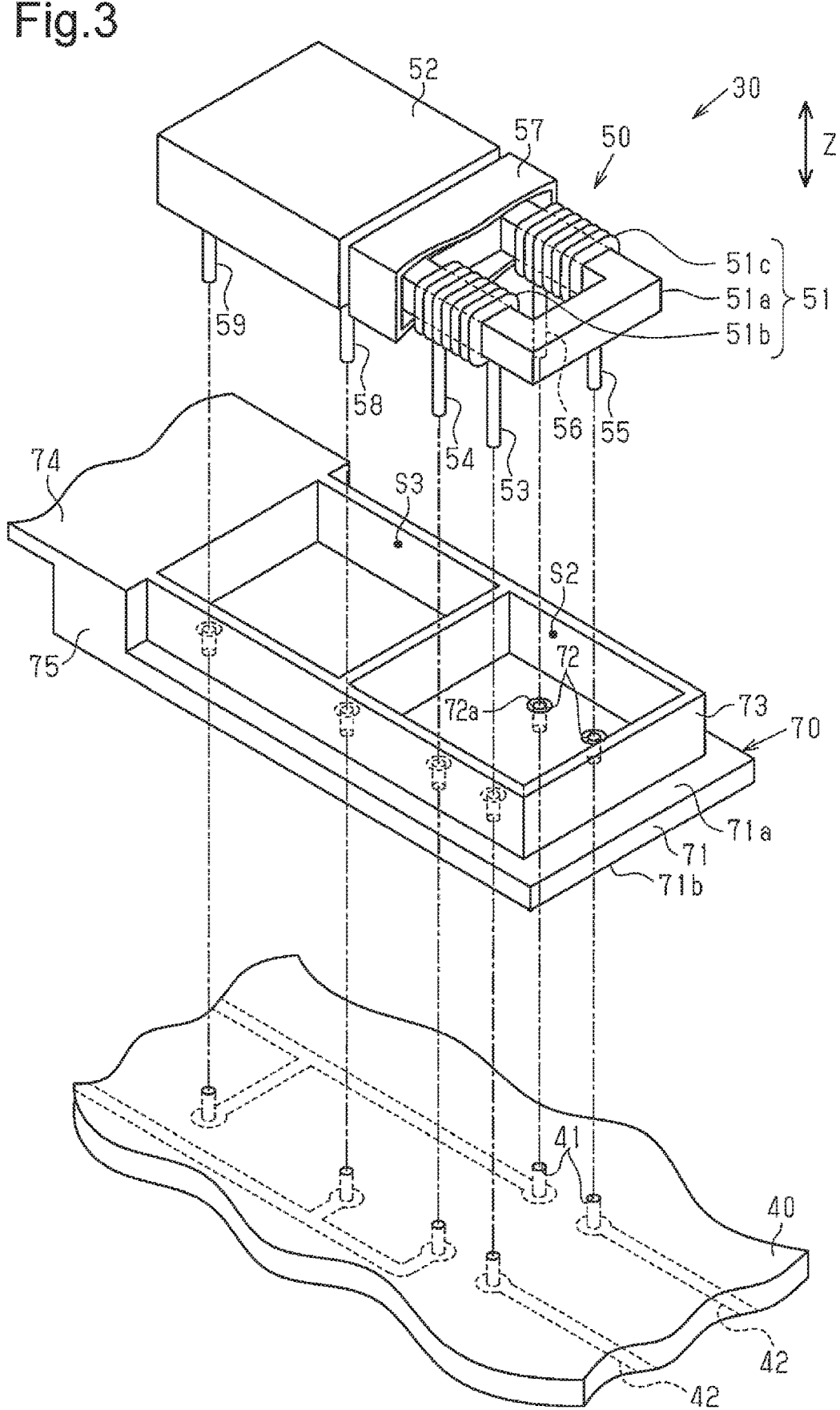
FIG. 3 is an exploded cross-sectional view of the inverter device shown in FIG. 2.

As shown in FIGS. 2 and 3, the inverter device 30 includes a circuit board 40, a filter circuit 50, an inverter circuit 60, and a metal member 70.

The circuit board 40 has the form of a plate (more specifically, circular plate). The circuit board 40 is opposed to the housing 11. The coupling wall 11c includes a housing end surface 11d opposing the cover 31. That is, the circuit board 40 is opposed to the housing end surface 11d. The circuit board 40 includes a board surface opposing the housing end surface 11d in the axial direction of the rotation shaft 21. The housing end surface 11d is an outer surface of the housing 11.

The circuit board 40 includes terminal holes 41 and pattern wires 42. The pattern wires 42 are electrically connected to terminals inserted into the terminal holes 41. In the present embodiment, the pattern wires 42 are formed on a surface of the circuit board 40 opposite to the surface opposing the housing end surface 11d. However, the pattern wires 42 may also be formed on the opposing surface or only on the opposing surface. When the circuit board 40 is a multilayer board, the pattern wires 42 may be located on a plurality of layers.

The filter circuit 50 reduces inflow noise included in the direct current power that is supplied from the on-vehicle power storage device 103 to the inverter device 30. The filter circuit 50 is, for example, an LC resonant circuit including a common-mode choke coil 51 and a capacitor 52. When current flows to the common-mode choke coil 51 and the capacitor 52, the common-mode choke coil 51 and the capacitor 52 generate heat and electromagnetic noise. In the present embodiment, each of the common-mode choke coil 51 and the capacitor 52 corresponds to a "heat-generating component."

As shown in FIG. 3, the common-mode choke coil 51 includes a core 51a, a first coil 51b, and a second coil 51c. The first coil 51b and the second coil 51c are wound around the core 51a.

The core 51a has, for example, a closed (endless) shape and is polygonal (in the present embodiment, rectangular). Further, the core 51a has a predetermined thickness. In other words, the core 51a is frame-shaped and has a predetermined height. In the present embodiment, the core 51a is formed by a single part. Instead, the core 51a may be formed by, for example, coupling two symmetrical parts. Alternatively, the core 51a may be formed by three or more parts.

The two coils 51b and 51c are opposed to each other and wound around axes that extend in the same direction. In the present embodiment, the two coils 51b and 51c have the same number of windings (turns). The two coils 51b and 51c are wound to generate magnetic fluxes that strengthen each other when common-mode current flows in the same direction to the two coils 51b and 51c and cancel each other when normal-mode current flows in opposite directions to the two coils 51b and 51c.

Under a situation in which normal-mode current flows to the two coils 51b and 51c, leakage flux occurs in the common-mode choke coil 51. That is, the common-mode choke coil 51 has a predetermined inductance when normal-mode current flows. In other words, the common-mode choke coil 51 has a relatively high impedance (more specifically, inductance) when common-mode current flows and a relatively low impedance when normal-mode current flows. Leakage flux occurs around the common-mode choke coil 51 and tends to concentrate at the two ends of each axis around which the two coils 51b and 51c are wound.

As shown in FIGS. 2 and 3, the common-mode choke coil 51 includes a first input terminal 53 and a first output terminal 54 extending from the first coil 51b and a second input terminal 55 and a second output terminal 56 extending from the second coil 51c.

Each of the terminals 53 to 56 extends in an opposing direction Z in which the housing end surface 11d opposes the circuit board 40. The two input terminals 53 and 55 are connected to the connector 33 by the pattern wires 42 so that the two input terminals 53 and 55 receive direct current power from the on-vehicle power storage device 103. The two output terminals 54 and 56 are connected to the inverter circuit 60 by the pattern wires 42.

As shown in FIG. 2, the common-mode choke coil 51 is spaced apart from the circuit board 40 and located between the circuit board 40 and the housing 11 (more specifically, housing end surface 11d). More specifically, the common-mode choke coil 51 is located closer to the housing end surface 11d than the circuit board 40. In other words, the distance from the common-mode choke coil 51 to the circuit board 40 is longer than the distance from the common-mode choke coil 51 to the housing end surface 11d.

The motor-driven compressor 10 includes a thermally conductive insulator 57 that covers the entire common-mode choke coil 51. The insulator 57 is in contact with the common-mode choke coil 51 and the housing end surface 11*d*. Thus, heat generated at the common-mode choke coil 51 is transmitted by the insulator 57 to the coupling wall 11*c*. Each of the terminals 53 to 56 extends through the insulator 57.

The insulator 57 may be, for example, an insulative film or an insulative cover as long as the insulator 57 limits short-circuiting of the common-mode choke coil 51 with other components. In addition, the insulator 57 may be an insulative coating layer formed on a surface of the common-mode choke coil 51.

Further, when the insulator 57 is part of the common-mode choke coil 51 (heat-generating component), the common-mode choke coil 51 including the insulator 57 will be in direct contact with the housing end surface 11*d*.

As shown in FIG. 2, the capacitor 52 is spaced apart from the circuit board 40 and located between the circuit board 40 and the housing 11 (i.e., housing end surface 11*d*). More specifically, the capacitor 52 is located closer to the housing end surface 11*d* than the circuit board 40 and spaced apart from the circuit board 40. In other words, the distance from the capacitor 52 to the circuit board 40 is longer than the distance from the capacitor 52 to the housing end surface 11*d*.

The capacitor 52 includes an insulated surface. More specifically, the capacitor 52 is packaged with the capacitor 52 covered by an insulative cover. The capacitor 52 is insulated in contact with the housing end surface 11*d*. The capacitor 52 is, for example, box-shaped. However, the capacitor 52 may have any specific shape.

The capacitor 52 includes a first terminal 58 and a second terminal 59. The first terminal 58 and the second terminal 59 of the capacitor 52 are extended in the opposing direction Z and connected to both the common-mode choke coil 51 and the inverter circuit 60 by the pattern wires 42.

The capacitor 52 is an X-capacitor. Further, in addition to the capacitor 52, the filter circuit 50 may include a Y-capacitor (not shown) connected to the common-mode choke coil 51 and ground.

In such a structure, the filter circuit 50 including the common-mode choke coil 51 and the capacitor 52 reduces both common-mode noise, which is included in direct current power received by the inverter device 30, and normal mode noise of a predetermined frequency band. In the present embodiment, common mode noise and normal mode noise each correspond to "inflow noise."

The inverter circuit 60 includes a semiconductor module 61 that includes switching elements.

The semiconductor module 61 is a power module including power switching elements such as an insulated-gate bipolar transistor (IGBT). The semiconductor module 61 is located between the circuit board 40 and the housing 11 (i.e., housing end surface 11*d*). The semiconductor module 61 is coupled to the circuit board 40 by terminals. The semiconductor module 61 is packaged with the switching elements accommodated in an insulative cover.

The semiconductor module 61 may be located closer to the circuit board 40 than the housing end surface 11*d*. That is, the distance from the semiconductor module 61 to the housing end surface 11*d* may be longer than the distance from the semiconductor module 61 to the circuit board 40. However, the semiconductor module 61 may be located closer to the housing end surface 11*d* than the circuit board 40. Alternatively, the semiconductor module 61 may be located at the middle of the circuit board 40 and the housing end surface 11*d*.

The inverter circuit 60 is connected to the coils 25 by hermetically sealed terminals (not shown). The inverter circuit 60 performs switching operations with the switching elements in a predetermined pattern to convert the direct current power from the filter circuit 50 into alternating current power, which drives the electric motor 13. The inverter circuit 60 drives the electric motor 13 by outputting the converted alternating current power to the coils 25. For example, when the electric motor is a three-phase motor, the inverter circuit 60 is a three-phase inverter.

The common-mode choke coil 51, the capacitor 52, and the semiconductor module 61 are arranged next to one another. In this case, the capacitor 52 is located between the semiconductor module 61 and the common-mode choke coil 51. Further, the distance from the semiconductor module 61 to the capacitor 52 is longer than the distance from the common-mode choke coil 51 to the capacitor 52.

The metal member 70 is, for example, a thermally conductive and electrically conductive member of aluminum or the like. Further, the metal member 70 is a non-magnetic body having a relative permeability of 0.9 to 3.

As shown in FIGS. 2 and 3, the metal member 70 includes a first metal portion 71. The first metal portion 71 is located between the circuit board 40 and the heat-generating components, which are the common-mode choke coil 51 and the capacitor 52.

The first metal portion 71 has the form of a plate (for example, rectangular plate). The thickness-wise direction of the first metal portion 71 corresponds to the opposing direction Z. The first metal portion 71 covers both the common-mode choke coil 51 and the capacitor 52 as viewed from the circuit board 40. That is, the first metal portion 71 covers surfaces of the common-mode choke coil 51 and the capacitor 52 that oppose the circuit board 40.

The first metal portion 71 includes a first plate surface 71*a* opposing the housing end surface 11*d* and a second plate surface 71*b* opposing the circuit board 40.

The first plate surface 71*a* is in contact with both the insulator 57, which covers the common-mode choke coil 51, and the capacitor 52. Thus, heat is transmitted from the common-mode choke coil 51 through the insulator 57 to the first metal portion 71. Further, heat is transmitted from the capacitor 52 to the first metal portion 71. That is, the first metal portion 71 absorbs the heat of the common-mode choke coil 51 and the capacitor 52.

The second plate surface 71*b* is spaced apart from the circuit board 40. Thus, a gap (air layer) extends between the second plate surface 71*b* and the circuit board 40. The gap insulates the metal member 70 from the circuit board 40. Further, the gap restricts the transmission of heat from the first metal portion 71, which receives heat from the common-mode choke coil 51 and the capacitor 52, to the circuit board 40.

Further, when electromagnetic noise is generated at the common-mode choke coil 51 and the capacitor 52, the first metal portion 71 blocks the electromagnetic noise. Thus, the first metal portion 71 restricts the transmission of electromagnetic noise to the pattern wires 42 of the circuit board 40. The electromagnetic noise blocked by the first metal portion 71 is converted into heat.

As shown in FIGS. 2 and 3, the first metal portion 71 includes through holes 72. The terminals 53 to 56, 58, and 59 are inserted into the through holes 72. The through holes 72 are each opposed to one of the terminals 53 to 56, 58, and 59. The through holes 72 are larger than the terminals 53 to 56, 58, and 59. An insulative layer 72*a* is applied to the wall surface of each through hole 72.

The terminals 53 to 56 of the common-mode choke coil 51 are inserted through the corresponding through holes 72 and the corresponding terminal holes 41. The terminals 53 to 56 are kept in contact with the corresponding insulative layers 72a. In this state, the terminals 53 to 56 electrically connect the common-mode choke coil 51 to the pattern wires 42. This limits short-circuiting of each of the terminals 53 to 56 with the metal member 70. The first metal portion 71 surrounds the terminals 53 to 56.

In the same manner, the terminals 58 and 59 of the capacitor 52 are inserted through the corresponding through holes 72 and the corresponding terminal holes 41. The terminals 58 and 59 are kept in contact with the corresponding insulative layers 72a. In this state, the terminals 58 and 59 electrically connect the capacitor 52 to the pattern wires 42. This limits short-circuiting of each of the terminals 58 and 59 with the metal member 70. The first metal portion 71 surrounds the terminals 58 and 59.

As shown in FIGS. 2 and 3, the metal member 70 includes a frame 73 that extends from the first plate surface 71a of the first metal portion 71.

The frame 73 defines a first partition chamber S2 corresponding to the outer shape of the common-mode choke coil 51 and a second partition chamber S3 corresponding to the outer shape of the capacitor 52. The common-mode choke coil 51 is accommodated in the first partition chamber S2, and the capacitor 52 is accommodated in the second partition chamber S3. The frame 73 entirely covers the side surfaces of the common-mode choke coil 51 (surfaces of common-mode choke coil 51 extending in opposing direction Z) and the side surfaces of the capacitor 52 (surfaces of capacitor 52 extending in opposing direction Z). That is, the metal member 70 covers the common-mode choke coil 51 and the capacitor 52 excluding portions that are in contact with the housing end surface 11d and portions through which the terminals 53 to 56, 58, and 59 extend. The side surfaces of the common-mode choke coil 51 include the peripheral surface of the core 51a and portions of the two coils 51b and 51c that correspond to the peripheral surface.

Further, the portions of the insulator 57 that cover the side surfaces of the common-mode choke coil 51 are in contact with the frame 73, and the side surfaces of the capacitor 52 are in contact with the frame 73. This increases the area of where heat is exchanged between the common-mode choke coil 51 and the metal member 70 and between the capacitor 52 and the metal member 70.

As shown in FIG. 2, the frame 73 includes a distal end surface that is in contact with the housing end surface 11d. Thus, heat is transmitted from the metal member 70 to the housing 11 through where the distal end surface of the frame 73 is in contact with the housing end surface 11d. However, the distal end surface of the frame 73 may be spaced apart from the housing end surface 11d. Alternatively, the distal end surface of the frame 73 may be in contact with the housing end surface 11d with an intervening object located in between.

The metal member 70 includes a second metal portion 74 and a connection portion 75. The second metal portion 74 is located between the semiconductor module 61 and the housing end surface 11d. The connection portion 75 connects the first metal portion 71 to the second metal portion 74.

The second metal portion 74 has the form of a plate. The thickness-wise direction of the second metal portion 74 corresponds to the opposing direction Z. The second metal portion 74 is larger than the semiconductor module 61 as viewed in the opposing direction Z. The second metal portion 74 is configured to receive heat from the semiconductor module 61. More specifically, the second metal portion 74 is in contact with the semiconductor module 61 as shown in FIG. 2.

The second metal portion 74 is at least partially in direct contact or indirect contact with the housing end surface 11d with an intervening object located in between. In the present embodiment, the entire second metal portion 74 is in direct contact or indirect contact with the housing end surface 11d with an intervening object located in between. That is, the entire surface of the second metal portion 74 (more specifically, entire surface of second metal portion 74 opposing housing end surface 11d) and the distal end surface of the frame 73 are in direct or indirect contact with the housing end surface 11d with an intervening object located in between. Thus, the metal member 70 absorbs heat from the common-mode choke coil 51, the capacitor 52, and the semiconductor module 61. Further, the metal member 70 transmits the absorbed heat to the housing 11 through the second metal portion 74, the frame 73, and the like. That is, the metal member 70 absorbs heat from the common-mode choke coil 51, the capacitor 52, and the semiconductor module 61 and transmits the heat to the housing 11. As described above, the housing 11 is cooled by refrigerant drawn from the suction port 11a.

The connection portion 75 is located between the capacitor 52 and the semiconductor module 61 and extended in the opposing direction Z. The first metal portion 71 partially overlaps the second metal portion 74 between the capacitor 52 and the semiconductor module 61 as viewed in the opposing direction Z. The connection portion 75 connects the overlapping portions. Thus, the metal member 70 has a crank-shaped cross section as viewed in FIG. 2. The side surface of the connection portion 75 opposing the capacitor 52 defines the second partition chamber S3. In the present embodiment, the first metal portion 71, the second metal portion 74, and the connection portion 75 are formed integrally with one another.

Although the semiconductor module 61 is spaced apart from the circuit board 40, the metal member 70 does not exist between the semiconductor module 61 and the circuit board 40. Further, the connection portion 75 serves as a coupling portion that couples the first metal portion 71 to the second metal portion 74.

Further, the metal member 70 is in direct contact or in indirect contact with the housing 11 with an intervening object in between. Thus, the metal member 70 and the housing 11 form a closed loop. Further, the metal member 70 is electrically connected to ground by the housing 11. This allows the metal member 70 to easily block electromagnetic noise.

The present embodiment has the advantages described below.

(1) The motor-driven compressor 10 serving as a fluid machine includes the housing 11 including the suction port 11a through which refrigerant serving as fluid is drawn, the electric motor 13 accommodated in the housing 11, and the inverter device 30 serving as a drive device that drives the electric motor 13. The inverter device 30 includes the circuit board 40 opposed to the housing 11. More specifically, the circuit board 40 is opposed to the housing end surface 11d, which is an outer surface of the housing 11. The circuit board 40 includes the pattern wires 42. The inverter device 30 includes the heat-generating components (more specifically, common-mode choke coil 51 and capacitor 52) located between the circuit board 40 and the housing end surface 11d and spaced from the circuit board 40. The heat-generating components generate electromagnetic noise.

In such a structure, the motor-driven compressor 10 includes the metal member 70 that transmits heat from the common-mode choke coil 51 and the capacitor 52 to the housing 11 and blocks the electromagnetic noise. The metal member 70 includes the first metal portion 71 located between the common-mode choke coil 51 and the circuit board 40 and between the capacitor 52 and the circuit board 40.

In such a structure, heat is transmitted from the common-mode choke coil 51 and the capacitor 52 through the metal member 70 to the housing 11, and the housing 11 is cooled by refrigerant. This allows the refrigerant to cool the common-mode choke coil 51 and the capacitor 52.

Further, the first metal portion 71 is located between noise sources (more specifically, common-mode choke coil 51 and capacitor 52) and the circuit board 40. Thus, the transmission of electromagnetic noise to the pattern wires 42 of the circuit board 40 through the region between the noise sources and the circuit board 40 is limited. This reduces defects of the inverter device 30 that would occur when electromagnetic noise is transmitted to the pattern wires 42. For example, the first metal portion 71 reduces erroneous operations of the inverter device 30 and limits decreases in the controllability of the electric motor 13. Accordingly, the efficiency for cooling the heat-generating components increases while limiting the transmission of electromagnetic noise from the heat-generating components to the circuit board 40.

(2) The insulator 57, which is in contact with both the first metal portion 71 and the common-mode choke coil 51, is located between the first metal portion 71 and the common-mode choke coil 51. In such a structure, heat is transmitted from the common-mode choke coil 51 through the insulator 57 to the first metal portion 71. This avoids short-circuiting of the common-mode choke coil 51 with the first metal portion 71 and allows for heat exchange between the common-mode choke coil 51 and the first metal portion 71.

(3) The common-mode choke coil 51 includes the terminals 53 to 56, and the capacitor 52 includes the terminals 58 and 59. The first metal portion 71 includes the through holes 72 through which the corresponding terminals 53 to 56, 58, and 59 are inserted. The terminals 53 to 56 of the common-mode choke coil 51 connect the common-mode choke coil 51 to the pattern wires 42 in a state insulated from the first metal portion 71 and inserted through the corresponding through holes 72. In the same manner, the terminals 58 and 59 of the capacitor 52 connect the capacitor 52 to the pattern wires 42 in a state insulated from the first metal portion 71 and inserted through the corresponding through holes 72. This electrically connects the common-mode choke coil 51 and the capacitor 52 to the pattern wires 42 while avoiding short-circuiting of each of the terminals 53 to 56, 58, and 59 with the first metal portion 71 that would be caused by the first metal portion 71 located between the common-mode choke coil 51 and the circuit board 40 and between the capacitor 52 and the circuit board 40.

(4) The common-mode choke coil 51 and the capacitor 52 are located closer to the housing 11 (i.e., housing end surface 11*d*) than the circuit board 40. Since the common-mode choke coil 51 and the capacitor 52 are near the housing end surface 11*d* or are in direct or indirect contact with the housing end surface 11*d* with an intervening object located in between, heat is transmitted from the common-mode choke coil 51 and the capacitor 52 to the housing 11. This further increases the efficiency for cooling the common-mode choke coil 51 and the capacitor 52. Further, the arrangement of the common-mode choke coil 51 and the capacitor 52 near the housing end surface 11*d* easily increases the distance from the common-mode choke coil 51 and the capacitor 52 to the circuit board 40. This allows the first metal portion 71 between the common-mode choke coil 51 and the circuit board 40 and between and the capacitor 52 and the circuit board 40 to have the thickness required to absorb or block electromagnetic noise in a more preferred manner.

When the distance from the common-mode choke coil 51 and the capacitor 52 to the circuit board 40 increases, the terminals 53 to 56, 58, and 59 are easily increased in dimension. Further, the motor-driven compressor 10 is installed in a vehicle, and vibration or impact may be applied to the terminals 53 to 56, 58, and 59. In this case, when the terminals 53 to 56, 58, and 59 are long, the terminals 53 to 56, 58, and 59 may easily be bent by vibration or impact.

In this regard, the present embodiment inserts the terminals 53 to 56, 58, and 59 into the corresponding through holes 72 of the first metal portion 71. The first metal portion 71 surrounds and reinforces the terminals 53 to 56, 58, and 59. Thus, even when the terminals 53 to 56, 58, and 59 are long, the first metal portion 71 protects the terminals 53 to 56, 58, and 59 from vibration and the like in a preferred manner.

(5) The inverter device 30 includes the filter circuit 50 that reduces inflow noise (more specifically, common-mode noise and normal-mode noise) included in direct current power that is received by the inverter device 30. Further, the inverter device 30 includes the inverter circuit 60 that receives direct current power, of which inflow noise has been reduced by the filter circuit 50, and converts the direct current power into alternating current power. The common-mode choke coil 51 and the capacitor 52 form the filter circuit 50.

In such a structure, the filter circuit 50 reduces inflow noise. This reduces defects of the inverter circuit 60 and limits decreases in the controllability of the electric motor 13 that would be caused by inflow noise. An increase in the cooling efficiency limits increases in the temperature of the common-mode choke coil 51 and allows more current to flow to the common-mode choke coil 51. Further, when temperature increases are limited in the capacitor 52, a capacitor having low heat resistance may be employed as the capacitor 52. In addition, the capacitor 52 may withstand large inflow noise.

(6) The filter circuit 50 is an LC resonant circuit including the common-mode choke coil 51 and the capacitor 52. The metal member 70 (i.e., first metal portion 71 and frame 73) covers at least part of the common-mode choke coil 51 (in the present embodiment, surface of common-mode choke coil 51 opposing circuit board 40 and side surfaces of common-mode choke coil 51). In such a structure, the metal member 70 functions as a damping resistor that reduces leakage flux of the common-mode choke coil 51. This lowers the Q-value of the filter circuit 50. Thus, the filter circuit 50 reduces normal-mode noise near the resonant frequency of the filter circuit 50. This widens the frequency band of normal-mode noise that can be reduced without using a separate, dedicated damping resistance and improves the versatility of the motor-driven compressor 10.

More specifically, the inverter device 30 shares the on-vehicle power storage device 103 with other on-vehicle devices. Thus, noise generated in the other on-vehicle devices may be normal-mode noise. In this case, the frequency of the noise generated by the other on-vehicle devices differs in accordance with the vehicle type, and the frequency of the normal-mode noise flowing to the inverter device 30 differs in accordance with the vehicle type. In this case, when the frequency band of normal-mode noise that can be reduced by the filter circuit 50 is narrow, the motor-driven compressor 10 may not be applicable depending on the vehicle type. This will decrease the versatility of the motor-driven compressor 10.

In this regard, the present embodiment widens the frequency band of normal-mode noise that can be reduced. This increases the vehicle types to which the motor-driven compressor 10 is applicable and improves the versatility of the motor-driven compressor 10.

(7) The inverter circuit 60 includes the semiconductor module 61 that includes switching elements. The semiconductor module 61 is located between the circuit board 40 and the housing end surface 11d. In addition to the first metal portion 71, the metal member 70 includes the second metal portion 74 that transmits heat from the semiconductor module 61 to the housing 11. The second metal portion 74 is located between the semiconductor module 61 and the housing end surface 11d. Such a structure increases the efficiency for cooling the semiconductor module 61.

In general, the semiconductor module 61 has a lower height than the common-mode choke coil 51 and the capacitor 52. That is, the dimension of the semiconductor module 61 in the opposing direction Z is smaller than that of the common-mode choke coil 51 and that of the capacitor 52. Further, as described above, the metal member 70 is located between the common-mode choke coil 51 and the circuit board 40 and between the capacitor 52 and the circuit board 40. Thus, the terminals of the semiconductor module 61 would have to be increased in dimension for the low semiconductor module 61 to contact the housing 11. In this case, the terminals may be broken by vibration or impact. In this regard, the present embodiment allows the terminals of the semiconductor module 61 to be shortened by an amount corresponding to the thickness of the second metal portion 74 (dimension of second metal portion 74 in opposing direction Z) while increasing the efficiency for cooling the semiconductor module 61. Accordingly, even when the inverter circuit 60 is arranged in the motor-driven compressor 10 installed in a vehicle to which large vibration or impact is applied, terminal breakage of the semiconductor module 61 caused by vibration or impact is limited.

(8) The metal member 70 includes the connection portion 75 that connects the first metal portion 71 to the second metal portion 74. This integrates the first metal portion 71 and the second metal portion 74 and increases the heat capacity of the metal member 70.

In particular, the present embodiment transmits heat, which is received by the first metal portion 71 from the common-mode choke coil 51 and the capacitor 52, through the connection portion 75 to the second metal portion 74 and then to the housing 11. This cools the first metal portion 71 in a preferred manner and further increases the efficiency for cooling the common-mode choke coil 51 and the like.

(9) The connection portion 75 is located between the capacitor 52 and the semiconductor module 61. This limits the transmission of electromagnetic noise from the capacitor 52 to the semiconductor module 61 through the region between the capacitor 52 and the semiconductor module 61. Thus, erroneous operations and the like of the switching elements of the semiconductor module 61 are limited.

(10) The metal member 70 includes the frame 73 extending from the first plate surface 71a of the first metal portion 71 that opposes the common-mode choke coil 51 and the capacitor 52. The frame 73 surrounds the common-mode choke coil 51 and the capacitor 52 and blocks the electromagnetic noise emitted from the side surfaces of the common-mode choke coil 51 and the side surface of the capacitor 52 in a more preferred manner. Further, heat is transmitted from the common-mode choke coil 51 and the capacitor 52 to the metal member 70 in a preferred manner. In addition, the distal end surface of the frame 73 contacting the housing end surface 11d allows heat to be efficiently transmitted from the metal member 70 to the housing 11.

It should be apparent to those skilled in the art that the present invention may be embodied in many other specific forms without departing from the spirit or scope of the invention. Particularly, it should be understood that the present invention may be embodied in the following forms.

A normal coil having a single wire may be used instead of the common-mode choke coil 51. However, it is preferred that the common-mode choke coil 51 be used to reduce both common mode noise and normal-mode noise.

The first metal portion 71 is opposed to the common-mode choke coil 51 and the capacitor 52 and located between the common-mode choke coil 51 and the circuit board 40 and between the capacitor 52 and the circuit board 40. Instead, the first metal portion 71 may be opposed to only one of the common-mode choke coil 51 and the capacitor 52. Further, the first metal portion 71 may be located between the semiconductor module 61 and the circuit board 40. In this case, the semiconductor module 61 corresponds to the "heat-generating component."

The metal member 70 is formed by integrating the first metal portion 71, the second metal portion 74, and the connection portion 75. Instead, the metal member 70 may be formed from multiple parts.

The connection portion 75 may be omitted. That is, the first metal portion 71 may be separate from the second metal portion 74.

At least one of the second metal portion 74 and the connection portion 75 may be omitted. Further, the first metal portion 71 may be located only between the common-mode choke coil 51 and the circuit board 40 and between the capacitor 52 and the circuit board 40. In other words, the metal member 70 only needs to transmit heat from at least one of the common-mode choke coil 51, the capacitor 52, and the semiconductor module 61 to the housing 11 and only needs to be located between the circuit board 40 and at least one of the common-mode choke coil 51, the capacitor 52, and the semiconductor module 61.

The frame 73 entirely covers the side surfaces of the common-mode choke coil 51. Instead, the frame 73 need only cover at least part of the common-mode choke coil 51. The same applies to the capacitor 52. Further, the frame 73 may surround only one of the common-mode choke coil 51 and the capacitor 52.

At least part of the frame 73 may be embossed or include a through hole (or slit). Alternatively, at least part of the frame 73 may be meshed. The same applies to the first metal portion 71 and the connection portion 75.

A slight gap may exist between the insulator 57 and the metal member 70 (first metal portion 71 and frame 73) or between the insulator 57 and the common-mode choke coil 51. In other words, the common-mode choke coil 51 and the metal member 70 only need to perform heat exchange through the insulator 57. The same applies to the capacitor 52.

In the present embodiment, the capacitor 52 is in direct contact or in indirect contact with the housing end surface 11d with an intervening object located in between. Instead, the capacitor 52 may be spaced apart from the housing end surface 11*d*. The same applies to the common-mode choke coil 51.

The second metal portion 74 is in direct contact or in indirect contact with both the semiconductor module 61 and the housing end surface 11*d* with an intervening object located in between. Instead, the second metal portion 74 may be spaced apart from at least one of the semiconductor module 61 and the housing end surface 11*d*.

Each of the terminals 53 to 56, 58, and 59 and the metal member 70 do not have to be insulated in the manner described in the embodiment and may be insulated in any manner.

The common-mode choke coil 51 and the like may be located closer to the circuit board 40 than the housing end surface 11*d* or located at the middle of the housing end surface 11*d* and the circuit board 40.

The core 51*a* may have any shape. The core 51*a* may be, for example, a UU core, an EE core, or a toroidal core. Further, the frame shape of the core 51*a* does not have to be continuous and may include a gap.

The metal member 70 is not limited to a non-magnetic body and may be a magnetic body. In this case, electromagnetic noise is absorbed by the metal member 70. In other words, the metal member only needs to absorb or block electromagnetic noise.

One of the common-mode choke coil 51 and the capacitor 52 does not have to be located between the circuit board 40 and the housing end surface 11*d*.

The filter circuit 50 may have any specific circuit structure. Further, the filter circuit 50 may be omitted.

The motor-driven compressor 10 of the present embodiment is of an in-line type. Instead, the motor-driven compressor 10 may be of a camelback type in which the inverter device 30 is coupled to the radially outer side of the housing 11. In this case, a side surface (more specifically, outer surface) of the housing 11 corresponds to the "housing end surface."

The motor-driven compressor 10 does not have to be used with the on-vehicle air conditioner 100. For example, when a fuel cell is installed in the vehicle, the motor-driven compressor 10 may be used with an air supply device that supplies the fuel cell with air. That is, the fluid that is compressed is not limited to refrigerant and may be, for example, air.

The fluid machine is not limited to the motor-driven compressor 10. For example, when a fuel cell is installed in the vehicle, the fluid machine may be an electric pump device that supplies the fuel cell with hydrogen. In this case, the electric pump device includes a pump, which supplies hydrogen of a hydrogen tank without compressing the hydrogen, and an electric motor, which drives the pump.

The motor-driven compressor 10 does not have to be installed in a vehicle.

Each of the embodiments may be combined with each of the modified examples.

Therefore, the present examples and embodiments are to be considered as illustrative and not restrictive and the invention is not to be limited to the details given herein, but may be modified within the scope and equivalence of the appended claims.

The invention claimed is:

1. A fluid machine comprising:
a housing including a suction port through which fluid is drawn;
an electric motor accommodated in the housing; and
a drive device configured to drive the electric motor, wherein the drive device includes:
a circuit board including a pattern wire, wherein the circuit board is opposed to an outer surface of the housing;
a heat-generating component located between the circuit board and the outer surface of the housing and spaced apart from the circuit board, wherein the heat-generating component generates electromagnetic noise;
a metal member that is at least partially located between the circuit board and the heat-generating component, wherein the metal member is configured to transmit heat from the heat-generating component to the housing and absorb or block the electromagnetic noise;
a filter circuit configured to reduce inflow noise included in direct current power that is received by the drive device; and
an inverter circuit that receives direct current power of which inflow noise has been reduced by the filter circuit, wherein the inverter circuit is configured to convert the direct current power into alternating current power,
the heat-generating component includes a coil that forms the filter circuit,
the inverter circuit includes a semiconductor module that includes switching elements,
the semiconductor module is located between the circuit board and the outer surface of the housing and is coupled to the circuit board by a terminal,
the metal member includes:
a first metal portion located between the coil and the circuit board,
a second metal portion located between the semiconductor module and the outer surface of the housing and configured to transmit heat from the semiconductor module to the housing, and
a connection portion that connects the first metal portion to the second metal portion,
the coil includes a terminal,
the first metal portion includes a through hole through which the terminal of the coil is inserted, and
the terminal of the coil connects the coil to the pattern wire in a state insulated from the first metal portion and inserted through the through hole.

2. The fluid machine according to claim 1, further comprising an insulator located between the first metal portion and the coil, wherein the insulator is in contact with both of the first metal portion and the coil.

3. The fluid machine according to claim 1, wherein the coil is located closer to the outer surface of the housing than the circuit board.

4. The fluid machine according to claim 1, wherein the fluid machine is a motor-driven compressor including a compression unit configured to compress fluid that is drawn from the suction port when the electric motor is driven.

* * * * *